C. D. BRIDDELL.
TRANSPLANTER.
APPLICATION FILED JAN. 28, 1908.

915,546.

Patented Mar. 16, 1909.
2 SHEETS—SHEET 1.

Witnesses

Inventor
C. D. Briddell.
By
Attorneys

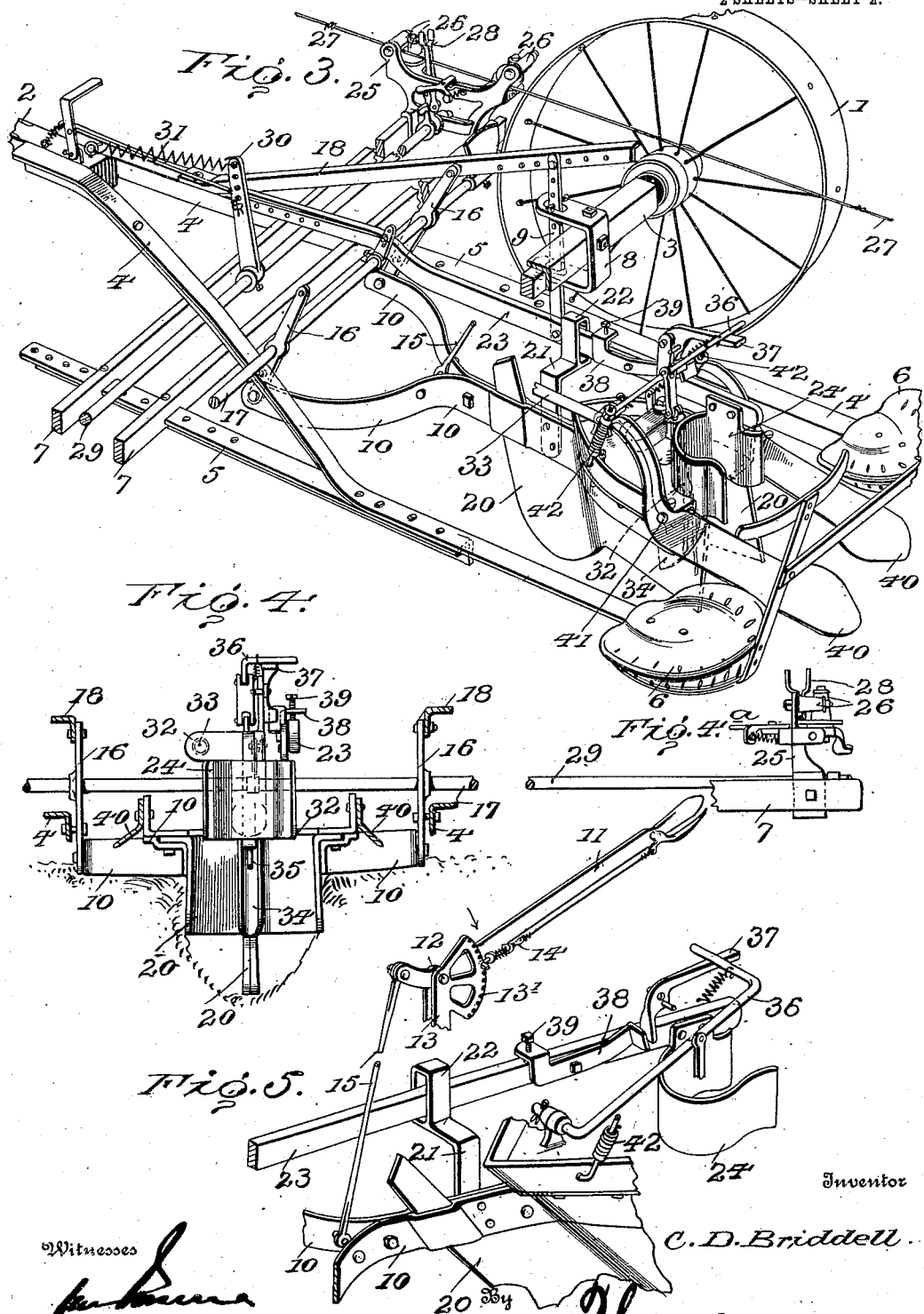

UNITED STATES PATENT OFFICE.

CHARLES D. BRIDDELL, OF MARION STATION, MARYLAND.

TRANSPLANTER.

No. 915,546.  Specification of Letters Patent.  Patented March 16, 1909.

Application filed January 28, 1908. Serial No. 413,091.

*To all whom it may concern:*

Be it known that I, CHARLES D. BRIDDELL, a citizen of the United States, residing at Marion Station, in the county of Somerset and State of Maryland, have invented certain new and useful Improvements in Transplanters, of which the following is a specification.

This invention appertains to agricultural machinery and more particularly to the type of implements designed for setting out plants, the purpose being to insure longitudinal and transverse alinement of the plants so as to leave clear tracks between the rows to insure thorough and effective cultivation without injuring the roots of the plants which is the case when the plants are out of line.

The present invention has relation most especially to the variety of transplanters which irrigate the plants at the time of setting the same and in which the operator is mounted upon the machine to be transported thereby over the field, the plants being placed in position and dropped in the trench or furrow by the operator.

In accordance with this invention, a check line is the actuating means for operating the transplanting and irrigating mechanisms, with the result that the plants are accurately positioned so as to aline both longitudinally and transversely of the field, leaving straight paths between the rows of plants for the cultivating machinery and for the horse or other draft animal, pulling said machinery over the field, to walk in.

For a full understanding of the invention and the merits thereof and also to acquire a knowledge of the details of construction and the means for effecting the result, reference is to be had to the following description and accompanying drawings.

Figure 1:
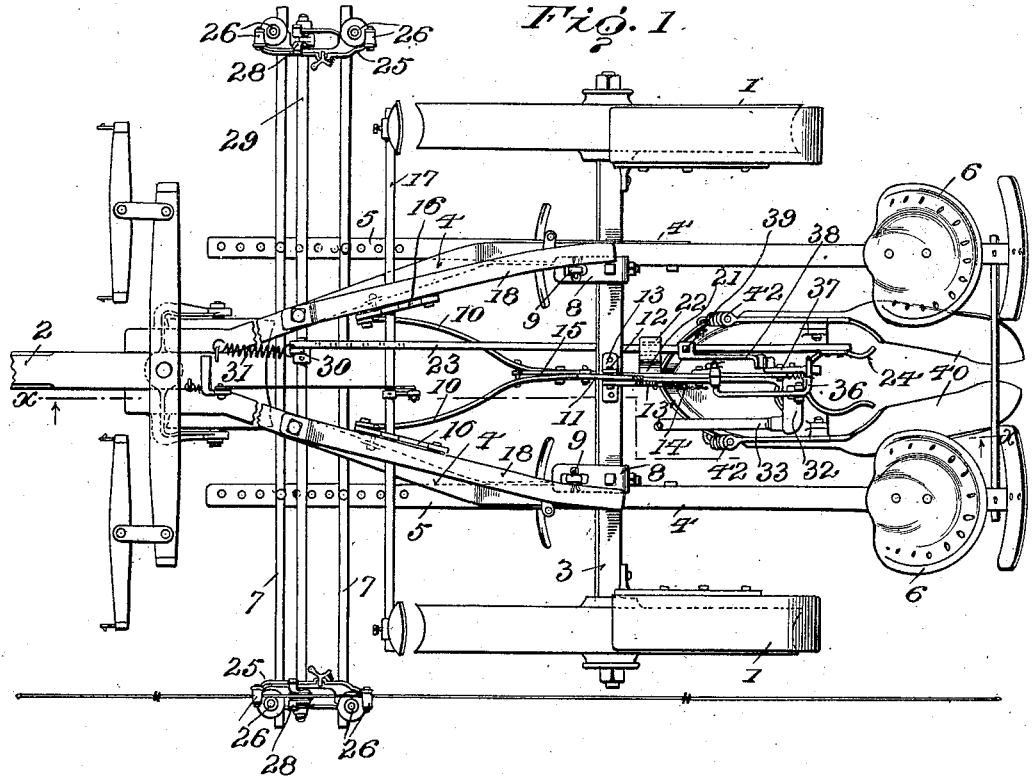
Figure 2:
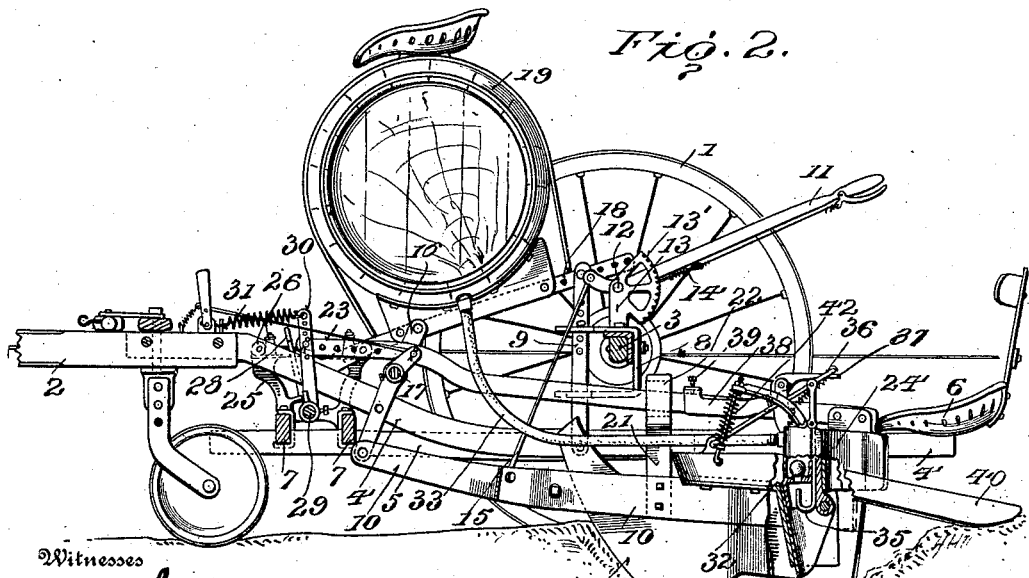

While the invention may be adapted to different forms and conditions by changes in the structure and minor details without departing from the spirit or essential features thereof, still the preferred embodiment is shown in the accompanying drawings, in which:

Figure 1 is a top plan view of a transplanter embodying the invention. Fig. 2 is a vertical longitudinal section of the transplanter on the line $x$—$x$ of Fig. 1, looking in the direction of the arrows. Fig. 3 is a perspective view of the implement, parts on the near side being broken away. Fig. 4 is a detail view of the transplanting mechanism, as seen from the rear. Fig. 4$^a$ is a view of the check mechanism as seen from the rear, showing the supporting bar and the rock shaft. Fig. 5 is a detail perspective view of the plant gage and holder, the means for operating the valve of the irrigator and the operating lever and connections for raising and lowering the furrow opener.

Corresponding and like parts are referred to in the following description and indicated in all the views of the drawings by the same reference characters.

The machine or implement consists of a framework mounted upon ground wheels 1 and adapted to be drawn over the field by means of a team which is hitched to a pole or tongue 2 and the usual swingle and double trees fitted to said pole. The ground wheels 1 are mounted upon an axle 3. Hounds or frame bars 4 are connected at their front ends to opposite sides of the rear end of pole or tongue 2 and incline rearwardly and downwardly, thence horizontally in parallel relation, being provided at their rear ends with seats 6. Longitudinal bars 5 have adjustable connection at their front ends with transverse bars 7 and at their rear ends with the bars 4. A bracket 8 is secured to each end portion of the axle 3 and is approximately of U-form, its horizontal members having openings in vertical alinement to receive a standard 9 which is vertically adjustable by means of several holes in which cotter pins are adapted to be inserted to hold the weight of the machine. The standards 9 connect at their upper ends to bars 18 and at their lower ends to the bars 4, thereby admitting of the seats 6 being adjusted vertically. It is noted that the standards 9 have the bars 4 connected thereto at their lower ends, said standards being adjustable in the brackets 8 and having the bars or braces 18 connected to their upper ends, said braces having their front ends connected to the front portions of the bars 4. It will thus be understood that the bars 4 are supported by means of the axle 3 and in turn support the bars 5, which latter form supporting means for the transverse bars 7. An operating lever 11 is pivoted at 12 to the upper end of a standard 13 secured at its lower end to the axle 3, and which standard is provided with a toothed segment 13' to coöperate with a latch bolt 14 mounted upon the operating lever 11 to secure the same in an adjusted position. A rod or like connection 15 is interposed between the front end of the operating lever 11 and the bar 10 to effect a raising or a lowering of said bar and attached parts by means of the operating lever 11. The bar 10 is forked at its front end, the forked members being pivoted to the lower ends of bars 16 mounted upon a traverse rod or bar 17 and having connection at their upper ends with the bars 18 which are secured at their front ends to the bars 4 and extend upwardly and rearwardly and support a barrel, cask or tank 19 containing the water for irrigating the plants. This construction admits of the vertical adjustment of the opener 20 in or out of the ground. The opener 20 for forming the trench or furrow to receive the plants, may be of any construction and is attached to the bar 10. An arm 21 projects upwardly from the bar 10 and is provided at its upper end with an eye or loop 22 forming a guide in which is loosely mounted a bar 23, said bar receiving a longitudinal movement and provided at its rear end with a plant gage or holder 24 and with means for tripping the valve mechanism by means of which the plants are irrigated.

A frame 25 is secured to opposite ends of the transverse bars 7 and is provided with the usual angularly disposed guide rollers 26 to retain a check line 27 in place. A fork 28 operates between the ends of the frame 25 and is secured at its lower end to a rock shaft 29 mounted in bearings in the frames 25. As the machine is drawn over the field, the abutments, knots or projections in the length of the check line 27 engage with the fork 28 and impart a vibratory movement thereto in the manner well understood, thereby causing the shaft 29 to receive a rocking movement. An arm 30 projects from the shaft 29 and turns therewith and has the bar 23 adjustably connected thereto. A spring 31 connects the upper end of the arm 30 with the front portion of the frame or the rear end of the pole or tongue 2 and serves to return the bar 23, shaft 29 and forks 28 to a normal or given position. The distance between the buttons or trips of the check line should correspond to the distance between the rock shaft 29 and the center of plant gage 24 to insure transverse alinement of the plants when recrossing the field, hence the advantage of adjustably connecting the transverse bars 7 with the longitudinal bars 5, thereby making provision for differently spacing the plants according to the distance between the buttons or trip projections of the check line employed.

The plant gage or holder 24 is of U-form and preferably consists of a broad strip of sheet metal bent into the shape substantially as shown and secured to the bar 23 and arranged with its open side facing rearward so as to readily clear the plants when released from the grip of the operator. The holder is slightly resilient and contracted at its open end and rearwardly flared to admit of the plants being placed in position. The holder is arranged at the rear of the opener 20 and directly above the same and moves rearwardly when the fork 28 is operated. The irrigating valve consists of a suitable casing 32 which is connected by means of a hose pipe 33 with the barrel or tank 19 supplied with a spout 34 arranged to direct the water into the furrow or trench upon the roots of the plants, said spout 34 extending into the space formed between the diverged rear ends of the opener 20. The valve is unseated or opened by means of a trip 35, the same being connected by a link to a pivoted arm 36 having a bent end to overhang a dog 37 pivoted between its ends and adapted to be engaged by means of a trip 38 pivoted between its ends to the bar 23 and having a portion receiving a set screw 39 for adjusting the lap or amount in engagement of the parts 37 and 38, whereby the quantity of water discharged at each operation of the valve may be regulated; or entirely thrown out of engagement when water is not needed. The dog 37 is pivoted to an extension of the valve casing, whereas the trip 38 is pivoted to the operating bar 23. As the bar 23 moves rearward, the end of the trip 38 engages with the end of the dog 37 and moves the latter and lifts the rear end of the arm 36, which moves the trip 35 and effects an opening or unseating of the valve, thereby permitting a quantity of water to discharge. The trip 38 clears the end of the dog 37 before the bar 23 reaches the limit of its rearward movement, and said trip on the return stroke of the bar 23 rides under the dog 37 without producing movement thereof. By proper adjustment of the set screw 39, the trip 38 may be regulated so as to clear the dog 37 at any relative point in the movement of the bar 23, with the result that the irrigating valve may be held open for a greater or less length of time, according to the amount of water to be supplied to each plant.

Pressure blades 40 extend rearward from the opener and are located upon opposite sides of the furrow or trench and are designed to compress the earth upon the roots of the plants. The pressure blades are spaced apart so as to clear the plants without injuring the same or pulling them from the trench after being set. The pressure blades are pivoted to the frame to which the runner 20 and valve 32 is attached at 41, and springs 42 exert an upward pressure upon the front ends thereof so as to cause the rear ends of the pressure blades to bear upon the earth with a greater or less degree of force.

In the operation of the machine, the same is drawn over the field and an operator occupies each seat 6 and is supplied with a quantity of plants to be set, each operator setting a plant in turn. The check line 27, after being positioned, is staked or pinned at each end and is arranged to engage with the fork 28 and is held to the frame 25 by the pairs of guide rollers 26. The operator takes a plant and places the same in the gage or holder 24 so that the roots enter the trench or furrow formed by the opener 20. When the button or projection of the check line engages with the fork 28, the shaft 29 is rocked, with the result that the bar 23 is moved rearward, thereby carrying the gage or holder 24. As the bar 23 moves rearward, the irrigating valve is opened by means of the trip device hereinbefore described, and the instant the button or trip of the check line clears the fork 28 and the bar 23 has moved forward by the action of the spring 31, the operator releases his hold upon the plant, which is set by the earth falling about the roots thereof, said earth being compressed or packed about the roots by means of the pressure blades 40. The water is supplied to the plants at or about the same instant, the several mechanisms being so timed as to effect this result. The bar 23 should have holes at the forward end to correspond with the holes in the bars 5 for adjusting when the check wire is changed to another number having different lengths between knots or buttons. The instant the bar 23 is released from the influence of the check line, it moves forward quickly and at this moment the plant is released, hence a field when set with plants has the latter arranged in longitudinal and transverse straight rows, which is of advantage in subsequent cultivation, as will be readily understood.

This invention is constructed in such a manner that it can be attached or removed from transplanter if desired, and also used in connection with the chain and cog mechanism now in use for operating the water valve which may be found desirable when it is desired to plant a crop that is not needed to be cultivated each way.

Having thus described the invention, what is claimed as new is:

1. In a transplanter and in combination with the transplanting mechanism, irrigating means embodying a valve, a trip mechanism for said valve embodying a dog and trip in coöperative arrangement, and means for relatively adjusting said dog and trip to vary their interval of engagement for regulating the supply of water to each plant.

2. In a planter, the combination with the transplanting mechanism, and irrigating means embodying a valve, means for tripping said valve, a dog in coöperative relation with said tripping means, a trip for said dog, a movable support for said trip, and adjusting means between the last mentioned trip and the support therefor to vary the interval of contact between the trip and dog for regulating the supply of water to each plant.

In testimony whereof I affix my signature in presence of two witnesses.

CHARLES D. BRIDDELL. [L. S.]

Witnesses:
LEROY A. BRIDDELL,
ERNEST A. FORD.